Jan. 10, 1928.
C. MACMILLAN
1,655,470
ELECTRIC SHIP PROPULSION
Filed March 21, 1924
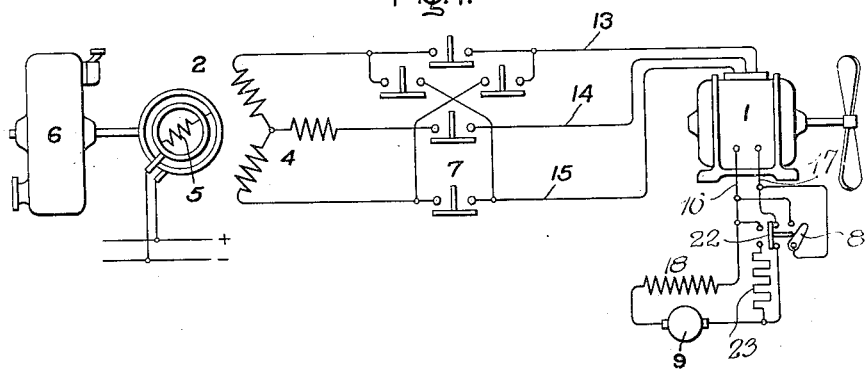
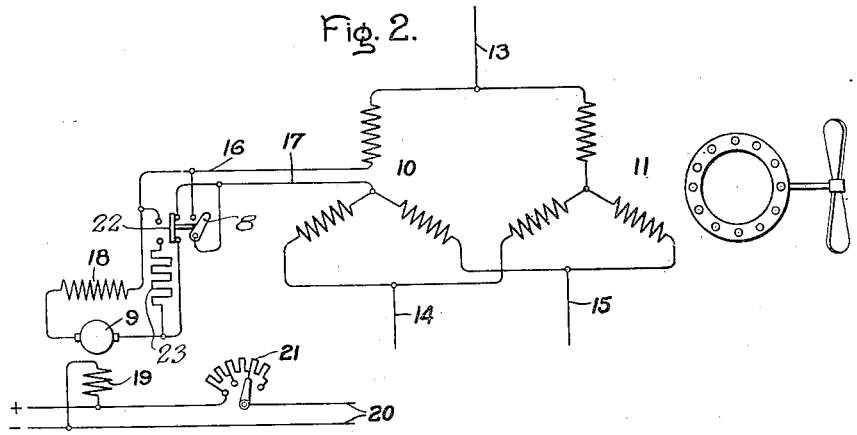
Inventor:
Campbell Macmillan,
by
His Attorney.

Patented Jan. 10, 1928.

1,655,470

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC SHIP PROPULSION.

Application filed March 21, 1924. Serial No. 700,973.

My invention relates to electric ship propulsion, and especially to an improved arrangement for maintaining upon the shaft of the propeller motor, during performance of the various operations required to stop and reverse the motion of the ship, a torque which is opposed to that produced by the propeller as it is dragged through the water due to the momentum of the ship.

If a ship is moving at full speed and the power supply of its propeller motor is suddenly interrupted, it is quite apparent that the ship will continue to move due to its momentum. During this movement the ship's propeller is dragged through the water thereby causing it to operate as a turbine and a maximum torque nearly equal to the full load torque of the motor must be exerted to break the propeller from the water. This maximum torque occurs when the propeller speed has been decreased to about 35 per cent of its full value. At lower speeds the propeller can be readily stopped and can be held at standstill by a braking torque of only 40 per cent full load torque. If the ship is to be stopped quickly it is necessary both to stop the propeller and to revolve it in the reverse direction. Since these operations must be performed with a counter torque continuously exerted by the propeller it is very desirable to avoid interruption of the motor torque at any stage of the operation. In accordance with my invention a source of current is provided for dynamically braking the motor to bring the propeller to standstill and means are provided for connecting the motor for operation in the reverse direction without interrupting its supply of current. The torque of the propeller motor is thus maintained throughout the operations of stopping and reversing the movement of the propeller.

An object of my invention is to provide an improved means for utilizing dynamic braking in bringing the propeller to rest when it is desired to stop or reverse the movement of the ship. A further object is to provide a motor adapted to be supplied with current from one source for braking and to be connected to another source for driving without interruption of the motor torque.

My invention will be better understood from the following description when considered in connection with the accompanying drawing, and its scope will be pointed out in the appended claims.

Referring to the drawing, Fig. 1 shows a system of ship propulsion in which my invention has been embodied; and Fig. 2 shows certain details of a motor adapted for use in the system shown by Fig. 1.

Fig. 1 shows a propeller motor 1 arranged to be supplied with current from an alternator 2 comprising an armature winding 4 and a field winding 5. A suitable prime mover, such as an adjustable speed steam turbine 6, is provided for driving the generator 2, and switches 7 are provided for interrupting and reversing the connections between this generator and the motor 1. A switch 8 is arranged to short-circuit the leads through which the motor 1 is connected to an exciter 9 for a purpose explained hereinafter. A switch 22 operable in response to movement of the switch 8 is provided for connecting the resistor 23 in the load circuit of the exciter when it is short-circuited.

Fig. 2 shows a motor primary winding comprising two Y-connected sections 10 and 11 which are arranged to be connected either to a polyphase alternating current source through leads 13, 14, and 15 or to the exciter 9 through leads 16 and 17 and a reactor 18. The exciter 9 is provided with a field winding 19 arranged to be supplied with current through leads 20 and an adjustable rheostat 21.

Assuming the exciter 9 to be short-circuited by the switch 22 operated in response to the movement of switch 8 and the generator 2 to be unexcited, the ship may be started from rest by closing the reversing switch 7 in the proper direction, supplying excitation to the generator field winding 5 and gradually increasing the speed of the turbine 6 until the generator 2 and motor 1 are operating at normal speed.

To stop and reverse the movement of the propeller while the ship is in motion, the excitation of the generator 2 is first reduced to a low value or to zero and the switch 7 is operated to reverse the connections between the motor and generator. The switch 8 is then opened and the machine 9 is excited to supply current to the winding sections 10 and 11 for dynamically braking the motor 1 to break the propeller from the water. When the propeller speed has been sufficiently reduced, the generator 2 will be excited and will supply polyphase currents of a phase rotation to exert torque to drive the propeller motor in the reverse direction. As the alternating current torque of the motor increases, the excitation of the machine 9 may be decreased and, when sufficient torque to hold the propeller is produced by the alternating current, the switch 8 may be closed. Thereafter the propeller operates in the reverse direction to bring the ship to rest and to reverse the direction of its movement.

The right hand and left hand star diagrams of Fig. 2 represent the windings of two segregated sections consisting of groups of poles. Each star represents a group of adjacent poles which reverses simultaneously with reversal of current in the corresponding group of windings. The number of motor poles is not changed in the transition from dynamic braking to normal operation. This result is obtained by supplying the braking current through the neutral connection of each alternate section. Current is thus supplied to adjacent sections in parallel during normal operation and in series while braking. This relative reversal of polarity of all the poles in one section as compared with those of another section in which the polarity of all the poles remains unchanged is inherent in the change from multiple to series connection which is provided for in the switching connections shown. The change to the series connection while braking is also advantageous in that the individual sections offer less opposition to direct current than to alternating current. In order to prevent the flow of excessive alternating current through the machine 9 during the transition period it may be connected in series with current limiting means such as a reactor 18.

I have explained my invention by illustrating and describing one specific embodiment thereof but it will be readily understood by those skilled in the art that the invention may be embodied in other forms than that shown and described. The number of winding sections, for example, is obviously not limited to a single pair as illustrated. The terms of the appended claims are, therefore, not restricted to the precise structure disclosed, but are intended to cover all changes and modifications within the spirit and scope of my invention.

What I claim as new and desire to secure by Letters Patent of the United States, is:—

1. An electric power system comprising a source of direct current, a source of alternating current, a motor having a polyphase winding composed of sections, means for supplying alternating current from said source to said sections in parallel for driving said motor, and means for connecting said source of direct current into one of said sections while maintaining the supply of alternating current to supply direct current to said sections in series for dynamically braking said motor whereby the transition between the operations of braking and driving said motor may be accomplished without interrupting the torque of said motor.

2. An electric power system of the class described comprising a load motor having a polyphase winding arranged in sections, a plurality of sources for supplying current to said winding, means for connecting said sections in parallel to one of said sources for driving said motor, and means for controlling the connections of one of said sections to connect said sections in series to another of said sources for dynamically braking said motor.

3. An electric power system of the class described comprising a load motor having a polyphase winding arranged in sections, direct current and polyphase sources for supplying current to said winding, means for connecting said sections in parallel to said polyphase source for driving said motor, and means for controlling the connections of one of said sections to connect said sections in series to said direct current source for dynamically braking said motor.

4. An electric power system of the class described comprising a load motor having a polyphase winding arranged in Y-connected sections, direct current and polyphase sources for supplying current to said winding, means for connecting said sections in parallel to said polyphase source for driving said motor, and means for opening the neutral connection of one of said sections and connecting said sections in series to said direct current source for dynamically braking said motor.

5. An electric power system comprising a load motor having a polyphase winding arranged in sections, direct current and polyphase sources for supplying current to said winding, means for connecting said sections in parallel to said polyphase source for driving said motor, means for controlling the connections of one of said sections to connect said sections in series to said direct current source for dynamically braking said motor, and current limiting means in series with said direct current source for limiting the current supplied to said direct current source from said alternating current source when both sources are connected to said winding.

6. The method of stopping and reversing a polyphase motor having a winding arranged to be supplied with current from direct and alternating current sources which consists in connecting said winding to said direct current source for dynamically braking said motor, connecting said winding to said alternating current source for driving said motor in a reversed direction while maintaining the connections between said direct current source and said motor, and subsequently disconnecting said winding from said direct current source.

7. The method of stopping and reversing a polyphase motor having a winding arranged to be supplied with current from a plurality of sources which consists in connecting said winding to one of said sources for dynamically braking said motor, connecting said winding to another of said sources for supplying reverse driving current to said motor, and disconnecting said winding from said dynamically braking source.

8. In an electric power system, a load motor having a winding segregated into a plurality of sections, sources of direct current and polyphase current for supplying said sections, means for connecting said sections in parallel with a given pole number to said polyphase source for driving said motor, and means for connecting said sections in series to said direct current source while maintaining the same pole number for dynamically braking said motor.

In witness whereof, I have hereunto set my hand this 20th day of March, 1924.

CAMPBELL MACMILLAN.